US009418222B1

(12) United States Patent
Rivera et al.

(10) Patent No.: US 9,418,222 B1
(45) Date of Patent: Aug. 16, 2016

(54) TECHNIQUES FOR DETECTING ADVANCED SECURITY THREATS

(71) Applicant: Symantec Corporation, Mountain View, CA (US)

(72) Inventors: Shireen Rivera, Los Angeles, CA (US); Peter Ashley, Hopkinton, MA (US)

(73) Assignee: Symantec Corporation, Mountain View, CA (US)

( * ) Notice: Subject to any disclaimer, the term of this patent is extended or adjusted under 35 U.S.C. 154(b) by 39 days.

(21) Appl. No.: 14/039,985

(22) Filed: Sep. 27, 2013

(51) Int. Cl.
*G06F 21/00* (2013.01)
*G06F 21/55* (2013.01)
*G06F 21/57* (2013.01)

(52) U.S. Cl.
CPC ............ *G06F 21/554* (2013.01); *G06F 21/577* (2013.01); *G06F 21/57* (2013.01); *G06F 2221/034* (2013.01)

(58) Field of Classification Search
CPC ....... G06F 21/554; G06F 21/57; G06F 21/74; G06F 9/00; G06F 21/10; G06F 21/577; G06F 2221/034; G06F 2221/2101; G06F 2221/2143; G06F 21/6218; H04W 12/08; H04W 48/02; H04W 8/22; H04W 24/00; H04L 63/102

USPC ............................................. 726/2, 22, 23, 24
See application file for complete search history.

(56) References Cited

U.S. PATENT DOCUMENTS

| 8,769,684 | B2 * | 7/2014 | Stolfo et al. ..................... 726/23 |
| 9,009,829 | B2 * | 4/2015 | Stolfo et al. ..................... 726/23 |
| 2004/0111632 | A1 * | 6/2004 | Halperin ....................... 713/200 |
| 2007/0186275 | A1 * | 8/2007 | Shahbazi .......................... 726/2 |
| 2007/0261112 | A1 * | 11/2007 | Todd et al. ...................... 726/11 |
| 2007/0271614 | A1 * | 11/2007 | Capalik ........................... 726/23 |
| 2009/0241191 | A1 * | 9/2009 | Keromytis et al. ............. 726/23 |
| 2009/0327637 | A1 * | 12/2009 | Chouery ........................ 711/163 |
| 2010/0269175 | A1 * | 10/2010 | Stolfo et al. .................... 726/22 |
| 2011/0167494 | A1 * | 7/2011 | Bowen et al. ................... 726/24 |
| 2012/0131685 | A1 * | 5/2012 | Broch et al. .................... 726/30 |
| 2013/0269043 | A1 * | 10/2013 | Limaye et al. .................. 726/34 |
| 2015/0047032 | A1 * | 2/2015 | Hannis et al. .................. 726/23 |

* cited by examiner

*Primary Examiner* — Don Zhao
(74) *Attorney, Agent, or Firm* — Wilmer Cutler Pickering Hale and Dorr LLP

(57) ABSTRACT

Techniques for detecting advanced security threats are disclosed. In one particular embodiment, the techniques may be realized as a method for detecting a security threat including generating a resource at a client, implementing the resource on the client, monitoring system behavior of the client having the resource implemented thereon, determining whether a security event involving the implemented resource has occurred based on the monitored system behavior, and generating a report when it has been determined that the security event has occurred.

20 Claims, 5 Drawing Sheets

TECHNIQUES FOR DETECTING ADVANCED SECURITY THREATS

FIELD OF THE DISCLOSURE

The present disclosure relates generally to computer viruses and malware and, more particularly, to techniques for detecting advanced security threats.

BACKGROUND OF THE DISCLOSURE

Advanced security threats such as malware that target specific resources can often be difficult to detect. These types of advanced security threats may cause significant damage to any infected resources by accessing secure data, reducing resource performance, and exploiting resources to perform further malicious activity. One such example of an advanced security threat is Stuxnet. Accordingly, detection of such advanced security threats has become critical. However, traditional methods of detecting such advanced security threats are ineffective at detecting the threat until after the resources have been compromised or infected.

In view of the foregoing, it may be understood that there may be significant problems and shortcomings associated with traditional security threat detection.

SUMMARY OF THE DISCLOSURE

Techniques for detecting advanced security threats are disclosed. In one particular embodiment, the techniques may be realized as a method for detecting an advanced security threat comprising generating a resource at a client, implementing the resource on the client, monitoring system behavior of the client having the resource implemented thereon, determining whether a security event involving the implemented resource has occurred based on the monitored system behavior, and generating a report when it has been determined that the security event has occurred.

In accordance with other aspects of this particular embodiment, the resource is generated based on information received from a separate backend security system.

In accordance with other aspects of this particular embodiment, the resource is automatically generated upon receipt of the information from the backend security system, In accordance with additional aspects of this particular embodiment, the information received from the backend security system is included in a policy update.

In accordance with additional aspects of this particular embodiment, the resource is a decoy resource.

In accordance with additional aspects of this particular embodiment, the decoy resource is defined in accordance with a classification of the client.

In accordance with other aspects of this particular embodiment, the system behavior is monitored in accordance with a monitoring policy.

In accordance with additional aspects of this particular embodiment, the implemented resource is monitored at a level higher than other client resources based on the monitoring policy.

In accordance with additional aspects of this particular embodiment, the monitoring of the implemented resource is defined by the backend security system.

In accordance with further aspects of this particular embodiment, the method comprises transmitting the report to a backend security system, wherein the report includes detailed information regarding the security event and additional client behavior information, and wherein the security event is an attempted access of the implemented resource.

In another particular embodiment, the techniques may be realized as at least one non-transitory processor readable storage medium storing a computer program of instructions configured to be readable by at least one processor for instructing the at least one processor to execute a computer process for performing the method comprising generating a resource at a client, implementing the resource on the client, monitoring system behavior of the client having the resource implemented thereon, determining whether a security event involving the implemented resource has occurred based on the monitored system behavior, and generating a report when it has been determined that the security event has occurred.

In another particular embodiment, the techniques may be realized as a method for detecting a security threat comprising generating resource information specifying a resource to be implemented on a client, transmitting the resource information to the client, determining whether a report has been received from the client indicating that a security event involving the resource implemented at the client has occurred, analyzing the received report, and determining an appropriate action to be performed based on the report analysis.

In accordance with other aspects of this particular embodiment, the resource is a decoy resource.

In accordance with other aspects of this particular embodiment, the report indicates a type of the security event and at least one of an application, process, and user responsible for causing the security event.

In accordance with other aspects of this particular embodiment, the appropriate action is determined based on additional reports received from different clients having the resource implemented thereon.

In accordance with other aspects of this particular embodiment, the appropriate action is determined based on a predetermined reputation of an application that caused the security event.

In accordance with additional aspects of this particular embodiment, the appropriate action includes at least one of quarantining an application that caused the security event, generating a rule for the application, and adjusting a reputation of the application.

In accordance with further aspects of this particular embodiment, the method comprises transmitting information indicating the appropriate action to the client.

In another particular embodiment, the techniques may be realized as least one non-transitory processor readable storage medium storing a computer program of instructions configured to be readable by at least one processor for instructing the at least one processor to execute a computer process for performing the method comprising generating resource information specifying a resource to be implemented on a client, transmitting the resource information to the client, determining whether a report has been received from the client indicating that a security event involving the resource implemented at the client has occurred, analyzing the received report, and determining an appropriate action to be performed based on the report analysis.

In another particular embodiment, the techniques may be realized as a system for detecting a security threat comprising one or more processors communicatively coupled to a network, wherein the one or more processors are configured to generate a resource at a client, implement the resource on the client, monitor system behavior of the client having the resource implemented thereon, determine whether a security event involving the implemented resource has occurred based on the monitored system behavior, and generate a report when it has been determined that the security event has occurred.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
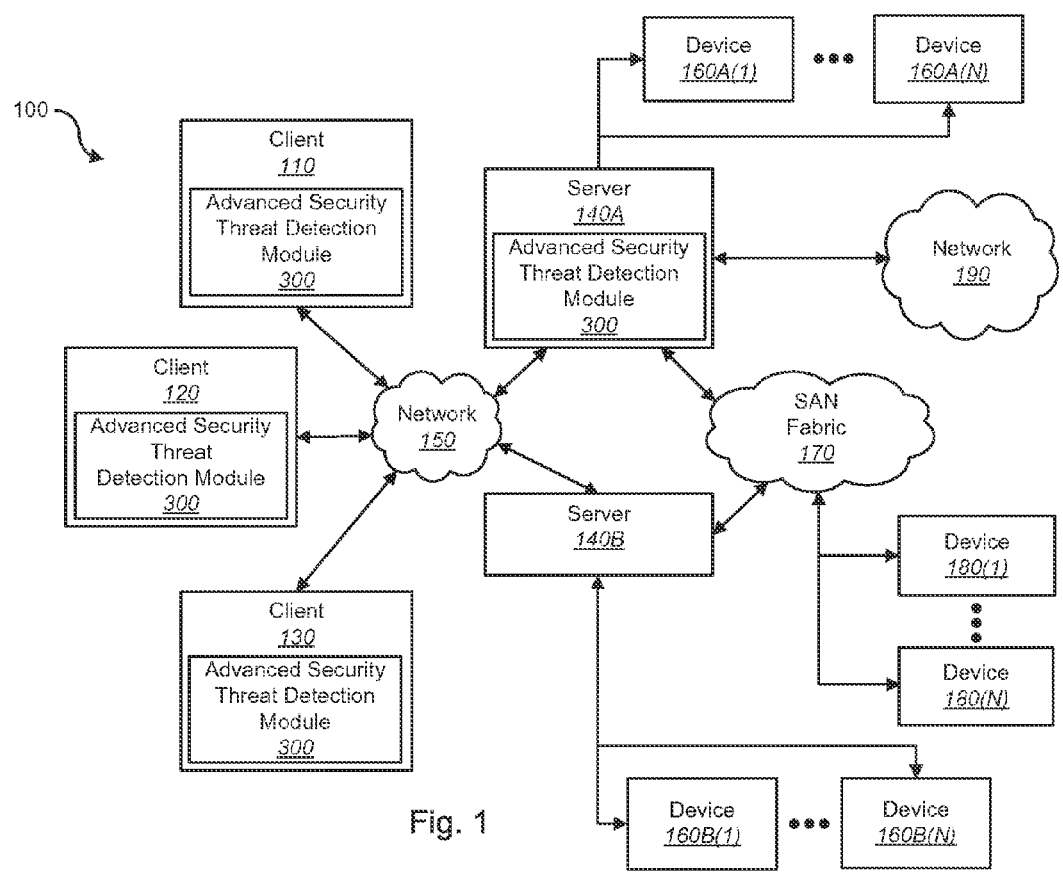
FIG. 1 shows a block diagram depicting a network architecture in accordance with an embodiment of the present disclosure.

FIG. 1 shows a block diagram depicting a network architecture 100 for detecting advanced security threats in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of each of which may be implemented using computer system 200 shown in FIG. 2). Client systems 110, 120 and 130 may be communicatively coupled to a network 150. Server 140A may be communicatively coupled to storage devices 160A (1)-(N), and server 140B may be communicatively coupled to storage devices 160B(1)-(N). Client systems 110, 120 and 130 may contain an advanced security threat detection module (e.g., advanced security threat detection module 300). In addition, servers 140A and 140B may contain an advanced security threat detection module (e.g., advanced security threat detection module 300). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
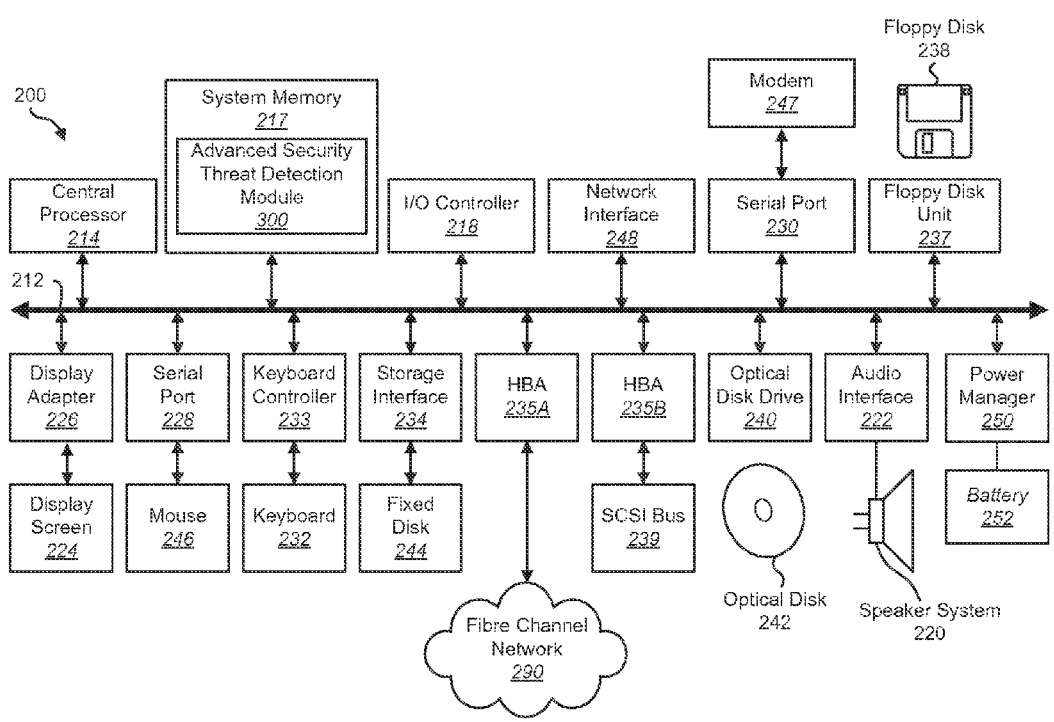
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on servers 140A and 140B using, for example, a web browser or other client software (not shown). Such a client may allow client systems 110, 120 and 130 to access data hosted by any one of servers 140A and 140B or one of storage devices 160A(1)-(N), 160B(1)-(N), and/or 180(1)-(N). In some embodiments, client systems 110, 120 and 130 may have a security agent implemented thereon to protect the client systems from security threats such as computer viruses and/or malware, and be in communication with a backend security system implemented on server 140A.

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to any one of servers 140A and 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. For example, storage devices 160B(1)-(N) and/or 180(1)-(N) may be used to store data replicated from storage devices 160A(1)-(N).

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, anti-malware/virus security servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage.

According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors. Further, the one or more portions of data that have been backed up or archived may be recovered upon occurrence of a particular event according to a failover policy. According to other embodiments, servers 140A and 140B may identify advanced security threats based on collected information from any source including clients 110 120, and 130. As a result, servers 140A and 140B may distribute information to clients 110, 120, and 130 to prevent malware and viruses from infecting clients 110, 120, and 130.

According to some embodiments, clients 110, 120, and 130 may contain one or more portions of software for detection of advanced security threats such as, for example, advanced security threat detection module 300. In addition, server 140A may contain one or more portions of software for detection of security threats such as, for example, advanced security threat detection module 300. As illustrated, one or more portions of the advanced security threat detection module 300 may reside at a network centric location. According to some embodiments, network 190 may be an external network (e.g., the Internet) and server 140A may be a gateway or firewall between one or more internal components and clients and the external network. According to some embodiments, the advanced security threat detection module 300 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, the advanced security threat detection module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
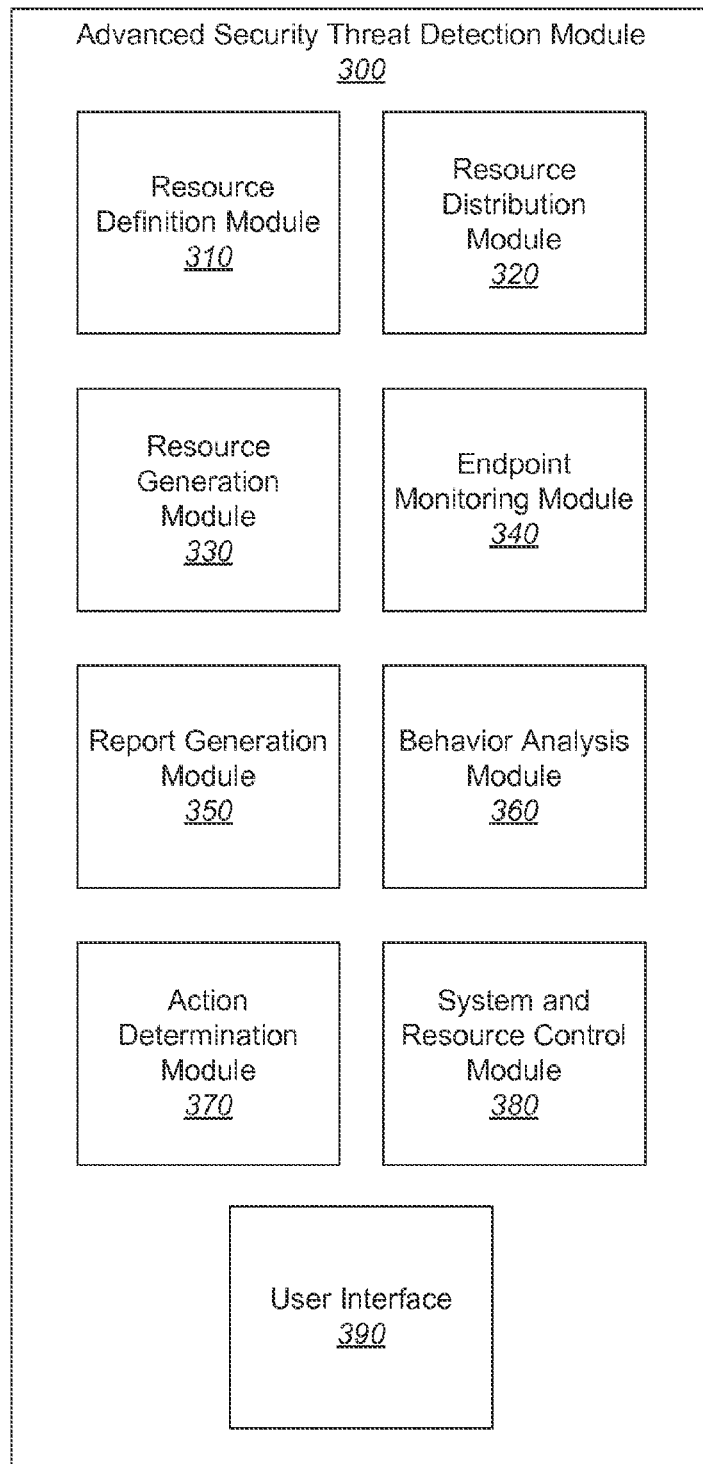
FIG. 3 shows an advanced security threat detection module in accordance with an embodiment of the present disclosure.

FIG. 3 shows an advanced security threat detection module 300 in accordance with an embodiment of the present disclosure. As illustrated, the advanced security threat detection module 300 may contain one or more components including a resource definition module 310, a resource distribution module 320, a resource generation module 330, an endpoint monitoring module 340, a report generation module 350, a behavior analysis module 360, an action determination module 370, a system and resource control module 380, and a user interface 390.

The resource definition module 310 may define a resource to be implemented at an endpoint client. In some embodiments, the resource to be implemented is a decoy or honeypot resource having no actual functionality. The decoy resource may mimic actual resources implemented on an endpoint client (e.g., client 110). By mimicking actual high value resources, the decoy resource may deceive an unknown threat into accessing the decoy resource for exploitation such that the unknown threat may be detected. The decoy resource may be any resource of interest to a virus or malware creator seeking to exploit or infect a computing system. In addition, the decoy resource may be defined based on known illegitimate uses of such a resource on a particular endpoint, within a group of endpoints, or all endpoints. For example, the decoy resource may be any one of an administrator password, password lists, a database of confidential information, SQL records, cookies, remote access tools, remote access credentials, stored FTP credentials, etc. In some instances, the decoy may be an actual physical resource or a virtualized resource.

The resource definition module 310 may define a single resource at once or may define multiple resources to be implemented. In some embodiments, the resources to be implemented on endpoint clients may vary based on a classification of the client. In at least one example, the decoy resources may be resources that an attacker would expect to see on such a device and attempt to exploit. For example, decoy resources for servers may include open ports, SQL Server administrator consoles, application data, and/or fake directories. Additionally, decoy resources for desktop computers may include remote login information, documents, cookies, favorites, shortcuts, etc. In some instances, the resources to be implemented may be defined by a user or administrator via the user interface 390. Further, the resource definition module 310 may specify that the defined resource is to be monitored differently from other resources or is to be placed on a watch list. For instance, the resource definition module 310 may specify that any access to the defined resource is to be logged and immediately reported whereas other non-decoy resources are to be monitored less frequently.

The resource distribution module 320 may distribute information specifying the resources defined by the resources definition module 310 to endpoints. The resource distribution module 320 may also distribute updated monitoring policies for the defined resources to various endpoints (e.g., client 110, 120, and 130). In some embodiments, the resource definition information may be distributed to endpoints as part of a standard policy update. Additionally, the resource definition information may be propagated to one or multiple endpoints separate from a policy update.

The resource generation module 330 may generate the resources defined by the resource information distributed by the resource distribution module 320. In some embodiments, the resource generation module 330 may be arranged at each endpoint such that when new resource definition information is received, the defined resource may be automatically generated and implemented at the endpoints without user input at the endpoint. For example, the new resource definition information received may specify decoy administrator credentials having no actual ability to access any administrator functions and the resource generation module 330 may generate the decoy administrator credentials in accordance with the received information. The resource generation module 330 may also update any monitoring policies implemented at the endpoint in accordance with the information received from the resource distribution module 320.

The endpoint monitoring module 340 may monitor the behavior of resources and applications or processes being executed or implemented on an endpoint client. In some instances, the endpoint monitoring module 340 may be implemented as part of a security agent at an endpoint client. The endpoint monitoring module 340 may monitor various types of behavior of the endpoint client (e.g., client 110). For example, the endpoint monitoring module 340 may monitor an endpoint client for unauthorized access or modifications to system files, unauthorized access to an operating system, termination of security applications such as anti-virus applications, and malicious network activity. In addition, the endpoint monitoring module 340 may specifically monitor the decoy resource implemented by the resource generation module 330 in accordance with a monitoring policy. The monitoring policy may specify that the decoy resource is to be monitored more closely than other resources and any access carefully tracked. The endpoint monitoring module 340 may also utilize heuristics to monitor the behavior of the endpoint client to identify any potentially malicious activity.

The report generation module 350 may report the results of the endpoint monitoring from the endpoint monitoring module 340. In some embodiments, the endpoint monitoring module 340 may report the behavior to a backend system (e.g., server 140A) from a client (e.g., client 110, 120, or 130). The endpoint monitoring module 340 may report the results of the monitored behavior at regular intervals which may be varied depending on the activity at the endpoint client, continuously, or upon the occurrence of a particular behavior or activity at the endpoint client. In particular, the monitoring policy may specify that any activity with respect to the decoy resource is to be tracked and immediate reported by the report generation module to the backend system for analysis.

The behavior analysis module 360 may receive reports of endpoint monitoring transmitted by the report generation module 350. In some embodiments, the behavior analysis module 360 may be arranged at a backend system (e.g., server 140A) and be configured to receive reports of endpoint monitoring from one or a plurality of clients (e.g., clients 110, 120, and 130). Based on the reports received, the behavior analysis module 360 may determine an appropriate action to take with respect to the access, application, or process interacting with the decoy resource. For instance, the behavior analysis module 360 may determine that an application attempting to access the decoy resource is malicious.

In some embodiments, the behavior analysis module 360 may compare reports from multiple endpoints to determine whether a threat exists or whether the behavior is a false positive. The behavior analysis module 360 may also compare the report to known acceptable activity or illegitimate activity at the endpoint or similar endpoints within a particular group or network to determine whether a threat exists. Additionally, the behavior analysis module 360 may utilize whitelists and/or blacklists to determine whether a threat exists. In at least one embodiment, the behavior analysis module 360 may determine that a particular application implemented on multiple endpoints is attempting to access and exploit the decoy resource at each respective endpoint and is therefore malicious. In at least one example, the behavior analysis module 360 may determine that a particular user of an endpoint is attempting to access decoy administrator credentials and is therefore suspicious. The behavior analysis module 360 may also determine whether a threat exists or a particular application is exhibiting malicious behavior by utilizing heuristics and based on system and application behavior reported from at least one endpoint client.

The action determination module 370 may determine an appropriate action to take with respect to a particular application or process based on the report transmitted by the report generation module 350 and analyzed by the behavior analysis module 360. In some instances, the action determination module 370 may generate a rule to restrict an application or process when it is determined that the application or process is exhibiting malicious behavior. The action determination module 370 may also generate a rule specifying that a user is to be denied access to all resources, the application or process is to be blocked or denied access to any system resources, or the application or process is to only be executed on a secure virtual client. However, the action determination module 370 may determine that the activity is a false positive and that no remedial action is necessary.

The action determination module 370 may also update a reputation for the application or process identified by the behavior analysis module 360. For instance, the action determination module 370 may increase or decrease a previously established reputation in accordance with the analysis by the behavior analysis module 360. A previous reputation may be established or assigned based on the developer of the application, a reputation of a previous version of the application, monitored characteristics or behavior of the application at any time, a whitelist, a blacklist, or any other factor. The reputation may indicate a level of trust for the application or process. For example, the application or process may been assigned a good reputation (e.g., "safe") having a high level of trust based on the developer that released the application or process. In at least one example, the action determination module 370 may decrease a reputation of an application when it is determined by the behavior analysis module 360 that the particular application is exhibiting malicious or suspicious behavior.

The system and resource control module 380 may control any portion of an endpoint based on information from the action determination module 370. In some embodiments, the system and resource control module 380 may be implemented at each of the endpoints within the system. The system and resource control module 380 may determine permissions for a user, an application, a process, or any other component based on a reputation and/or a rule from the action determination module 370, and behavior of the system and application detected by the endpoint monitoring module 340. In some embodiments, the system and resource control module 380 may restrict the access of a user, an application, or a process to certain system resources based on a rule. In other embodiments, the system and resource control module 380 may permit the application full access to system resources when the user, application, or process has a trusted reputation. In another embodiment, the system and resource control module 380 may permit limited access to certain system resources based on a trusted reputation even though the application is exhibiting suspicious behavior.

The user interface 390 may provide a user or administrator with an interface to control any aspect to the processes described below. For example, the user interface 390 may display information about the endpoint behavior monitored by the endpoint monitoring module 340, the behavior of applicants analyzed by the behavior analysis module 360, and/or the rules generated by the action determination module 370.

Figure 4:
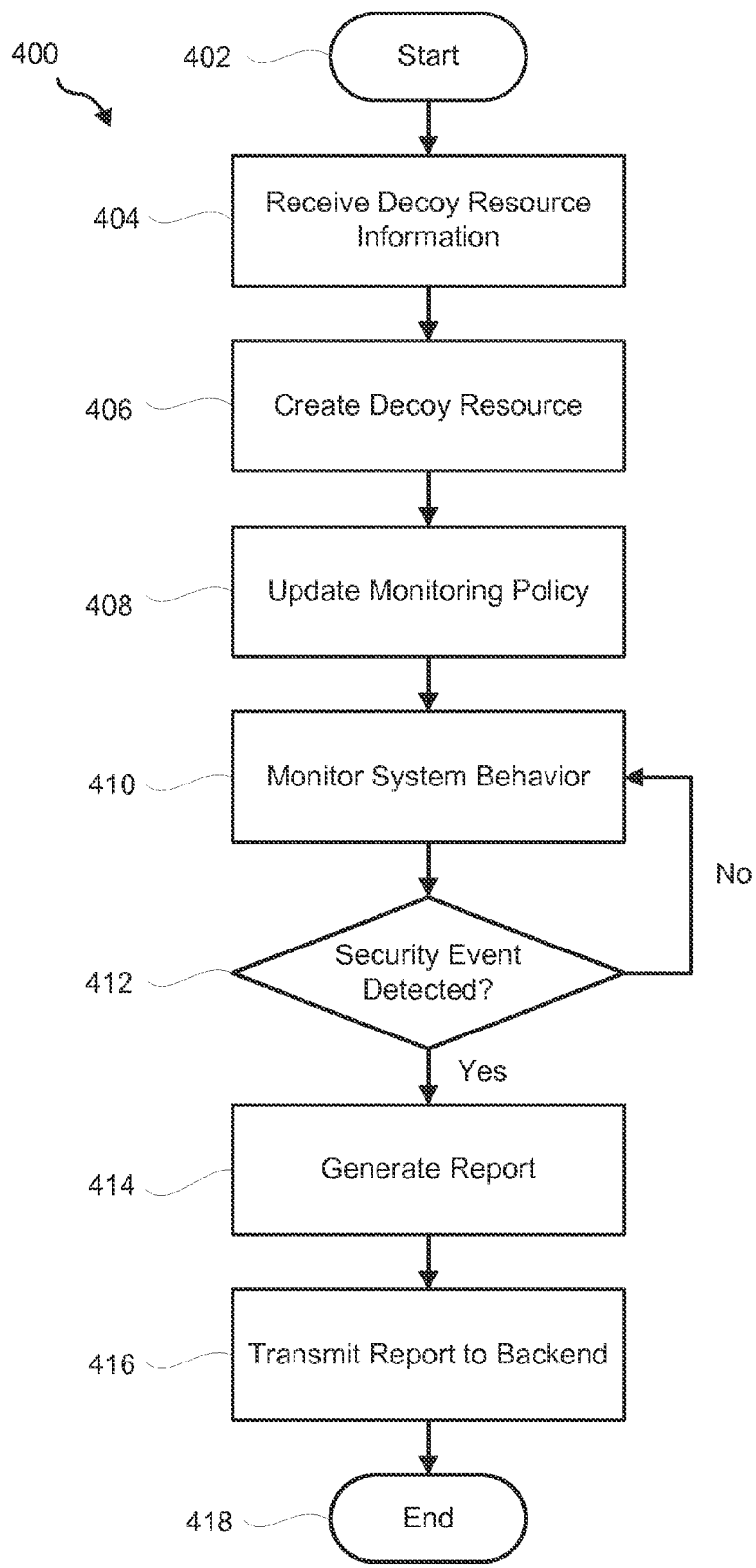
FIG. 4 a method for detecting advanced security threats in accordance with an embodiment of the present disclosure.

FIG. 4 shows a method 400 for detecting advanced security threats in accordance with an embodiment of the present disclosure. The method 400 may be performed across multiple devices including for example clients 110, 120, 130, and server 140A independently and concurrently. However, any portion of the method 400 described below may be performed on any one of clients 110, 120, 130, and server 140A at any time. At block 402, the method 400 may begin.

At block 404, new resource information may be received. In some embodiments, the new resource information may be received by the resource generation module 330 arranged at an endpoint (e.g., client 110). The new resource information may be received from the resource distribution module 320 arranged at a backend security system (e.g., server 140A). The new resource information may specify one or multiple resource to be generated and deployed at the endpoint. In some embodiments, the resource to be implemented is a decoy resource For instance, the new resource information may indicate that decoy administrator credentials are to be created. Additionally, the new resource information may include an update to a monitoring policy which indicates that the new resource to be created is to be monitored closely. After the new resource information has been received, the overall process may then proceed to block 406.

At block 406, a resource may be created or generated in accordance with the resource information received at block 404. In some embodiments, the resource may be created and implemented by the resource generation module 330. In at least one example, the resource may be a decoy resource created and implemented in a virtualized environment to reduce a risk to actual system resources. After the resource has been created and implemented, the overall process may proceed to block 506.

At block 408, a monitoring policy may be updated in accordance with the resource information received at block 404. In some embodiments, the monitoring policy may be updated by the resource generation module 330. For instance, the monitoring policy may be updated such that the endpoint monitors the decoy resource for any activity. Additional system resources may be monitored less frequently in accordance with the monitoring policy. After the monitoring policy has been updated, the overall process may then proceed to block 410.

At block 410, system behavior of the endpoint may be monitored. In some embodiments, the endpoint monitoring module 340 may monitor the behavior of the endpoint client (e.g., client 110). The monitoring of the endpoint client may be monitored continuously throughout each process step of process 400 or may be performed periodically. In addition, the behavior of the entire client and the decoy resource may be monitored in various ways.

In at least one embodiment, the endpoint may be generally monitored for unauthorized system directory access or modifications, unauthorized writing to an operating system, termination of security applications such as anti-virus applications, and malicious network activity. In addition, the decoy resource may be closely monitored for any read access or write access. In some instances, heuristics may be utilized to monitor the general behavior of the endpoint and the decoy resource to identify risky or suspicious behavior. The monitoring may be performed for a predetermined time period at regular intervals or continuously. In some embodiments, the endpoint behavior may be monitored in accordance with the monitoring policy. For example, when each application has a trusted or safe reputation according the monitoring policy, the endpoint behavior may be monitored less frequently whereas if an application has a suspicious or untrusted reputation, the endpoint may be monitored more frequently. The endpoint may monitor certain applications or processes less frequently based on an associated trusted reputation whereas other applications or processes may be monitored more frequently based on an associated suspicious reputation. Additionally, the decoy resource may be monitored at a high frequency or constantly in accordance with the updated monitoring policy. After the system behavior has been monitored, the process may proceed to block 412.

At block 412, it may be determined whether a security event has occurred or has been detected. In some embodiments, the endpoint monitoring module 340 may determine whether a security event has occurred. A security event may occur in relation to any resource of the endpoint. For instance, a security event may be detected upon unauthorized system directory access or modifications, unauthorized writing to an operating system, termination of security applications such as anti-virus applications, and malicious network activity. Additionally, a security event may be detected with respect to the decoy resource. For example, an application or process may attempt to access and read from decoy remote login information. If a security event has not been detected, the process may proceed back to block 410 where the endpoint behavior is continued to be monitored. However, if a security event has been detected, the process may proceed to block 414.

At block 414, a report specifying the detected security event may be generated. In some embodiments, the report generation module 350 may generate the report specifying the security event. The report generation module 350 may automatically generate a report upon the occurrence of the detected security event or may generate a report periodically based on any detected events over a predetermined period of time. In addition to generating a report, the endpoint may take remedial measures with respect to the perceived threat. For instance, the endpoint may terminate an application or process if that application or process attempts to read from the decoy resource. After the report has been generated, the process may proceed to block 416.

At block 416, the report may be transmitted from the endpoint (e.g., client 11) to a backend system (e.g., server 140A).

In some embodiments, the report generation module 350 may transmit the report from the endpoint client (e.g., client 110) to the backend system (e.g., server 140A). After the report has been reported to the backend system, the process may proceed to back to block 402 such that the overall process 400 may be repeated or to block 410 such that the system behavior may be monitored. In at least one embodiment, the process 400 may be executed across a plurality of endpoint clients (e.g., clients 110, 120, 130) such that each endpoint implements the decoy resource, monitors system behavior, and reports any security events involving the decoy resource to a backend system (e.g., server 140A).

The overall process 400 may then repeat periodically or continuously. In some instances, various elements of the overall process may be performed concurrently or sequentially. For example, an endpoint may be creating a new decoy resource while also transmitting a report of a detected security event in relation to a previously created decoy resource.

Figure 5:
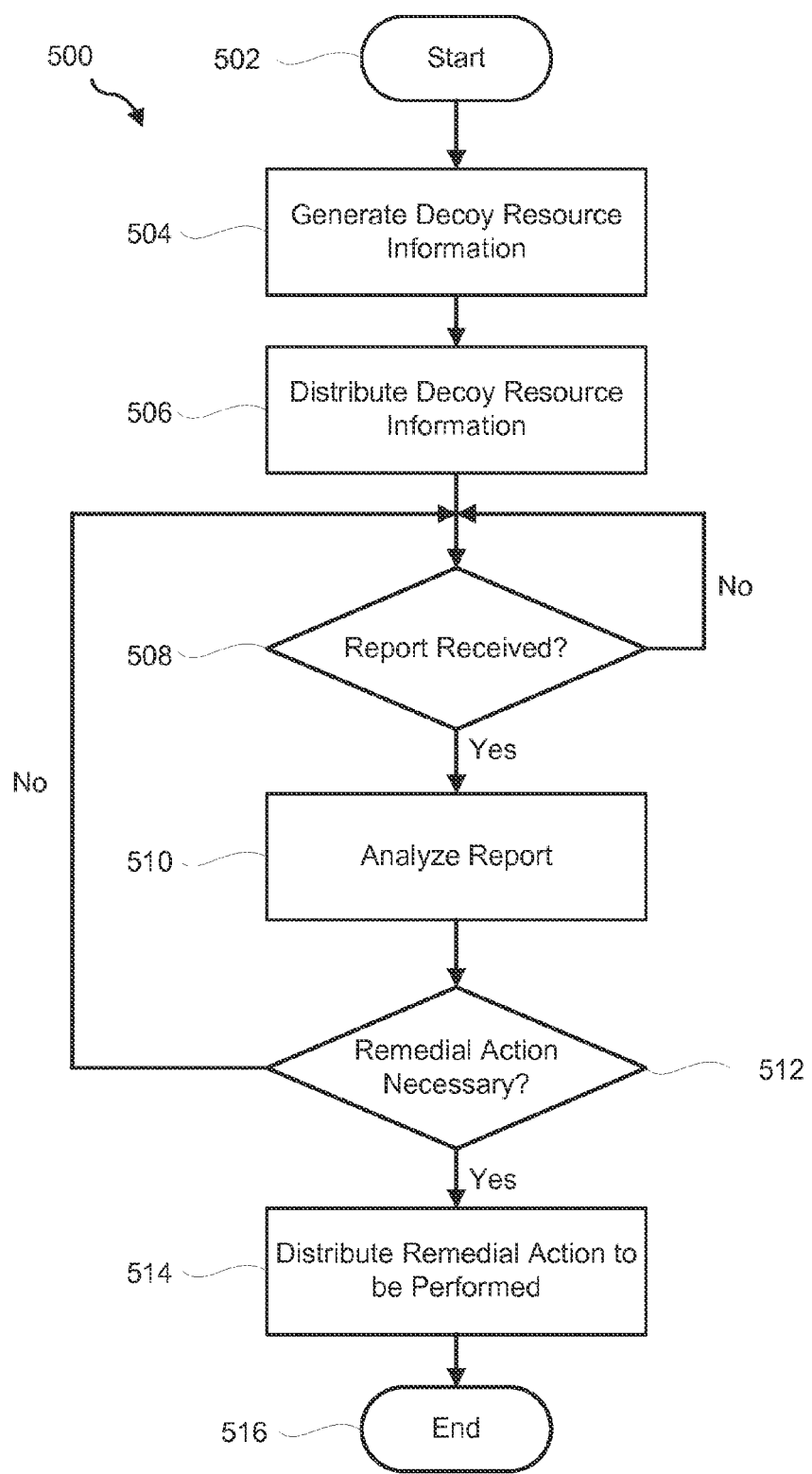
FIG. 5 a method for detecting advanced security threats in accordance with an embodiment of the present disclosure.

FIG. 5 shows a method 500 for detecting advanced security threats in accordance with an embodiment of the present disclosure. The method 500 may be performed across multiple devices including for example clients 110, 120, 130, and server 140A. However, any portion of the method 500 described below may be performed on any one of clients 110, 120, 130, and server 140A. At block 502, the method 500 may begin.

At block 504, decoy resource information may be defined. In some embodiments, the resource definition module 310 may define the decoy resource information. The decoy resource information specifies at least one decoy resource to be created and implemented on at least one endpoint. The decoy resource may be specified by a user or administrator of a backend security system (e.g., server 140A) via the user interface 390.

In some embodiments, the decoy resource or honeypot resource may have no actual functionality but may mimic actual resource functionality. As a result, threats may attempt to exploit the decoy resource thereby making their presence detectable. The decoy resource may be any resource of interest to a virus or malware creator seeking to exploit or infect a computing system. In addition, the decoy resource may be defined in accordance with the type of endpoint on which it is to be implemented and based on known usage of the endpoint. In some instances, the decoy resource may be any one of an administrator password, password lists, a database of confidential information, SQL records, cookies, remote access tools, remote access credentials, stored FTP credentials, or any other appropriate resource. In some instances, the decoy resource may be an actual physical resource or a virtualized resource.

Additionally, an updated monitoring policy may be defined in accordance with the at least one decoy resource to be implemented. In some embodiments, the resource definition module 310 may also define the updated monitoring policy. The updated monitoring policy may indicate that the defined resource is to be monitored differently from other resources or is to be placed on a watch list. After the decoy resource information is generated, the process may proceed to block 506.

At block 506, the decoy resource information may be distributed to each appropriate endpoint. In some embodiments, the resource distribution module 320 may propagate the decoy resource information to at least one endpoint (e.g., client 110) from a backend system (e.g., server 140A). The decoy resource information may be distributed to one particular endpoint, multiple endpoints within a particular group, or each known endpoint. In some instances the decoy resource information may be transmitted to certain endpoints based on a perceived or known threat to those endpoints. The decoy resource information may also be transmitted to the appropriate endpoint or endpoints with the updated monitoring policy. In at least one embodiment, the decoy resource information may be transmitted with a scheduled policy update or when a new endpoint come online for the first time and downloads an initial policy. In additional embodiments, the decoy resource information may be transmitted separately from a scheduled policy update. After the decoy resource information has been distributed, the overall process may proceed to block 508.

At block 508, it may be determined whether a report has been received from an endpoint. In some embodiments, the behavior analysis module 360 arranged at a backend system (e.g., server 140A) may receive a report from an endpoint (e.g., client 110). If it is determined that a report has not been received, the process may proceed back to block 508. However, if a report has been received, the process may proceed to block 510.

At block 510, the received report may be analyzed. In some embodiments, the received report may be analyzed by the behavior analysis module 360. In some instances, reports may be received from a plurality of clients (e.g., clients 110, 120, and 130) at a backend system (e.g., server 140A). The report may indicate whether an endpoint is exhibiting any general suspicious or malicious behavior and any particularized activity involving the decoy resource. The report may also include details of the general suspicious or malicious behavior and the particularized activity involving the decoy resource. For instance, the report may indicate when an attempt to access the decoy resource occurred, the application involved in the attempted access, and the user of the endpoint at the time of the access.

The report may further include any additional relevant information. For example, the report may specify an overall performance of the endpoint, any previously existing applications or processes, any new application, and any combination of information useful in determining whether an application or process is a threat and should be quarantined or terminated. The report may be received from an endpoint as part of a regular periodic report, upon the occurrence of a security event, or at any other time. Based on one or a plurality of reports received from endpoints, it may be determined whether a particular application or process is a threat. In addition, the determination of whether a particular application or process is a threat may be based on a previous reputation of the application or process, whitelists, blacklists, and any other appropriate information. After the report has been analyzed, the process may proceed to block 512.

At block 512, it may be determined whether remedial action is necessary with respect to a perceived threat. In some embodiments, the action determination module 370 may determine whether any action is to be taken based on the analysis performed at block 510. The necessary action may include, for example, establishing a new rule for an application, process or user, modifying a reputation of an application, or any other appropriate action to remedy an identified threat. For instance, if it is determined that a particular application is a threat at block 510, appropriate remedial action for that application may be determined at block 512.

In at least one example, it may be determined that the appropriate action is to generate and distribute a new rule to at least one endpoint when an application is determined to be a threat at block 510. The determination of whether to generate a new rule may be based on a report received from a single endpoint or a plurality of endpoints. In some embodiments, a new rule for a particular application may be generated when the report indicates that the particular application is responsible for attempting to access the decoy resource at one endpoint. Additionally, a new rule for a particular application may be generated when the reports indicate that the particular application is executed on each endpoint and is attempting to access the decoy resource at the respective endpoints. The new rule may instruct the endpoints to implement any one of a plurality of known security measures. For example, the new rule may indicate that the application is to be prevented from being loaded or executed, the application is to be executed in a secure sandbox, the application is to be moved to a virtual client for execution, or the application is to be completely removed from the endpoint.

Another action to be taken may include a change in the reputation of the application attempting to access the decoy resource. For example, the reputation of the application attempting to access the decoy resource on an endpoint may be changed from good to suspicious. The reputation of an application attempting to access decoy resources on a plurality of endpoints may be changed from good to malicious. In some embodiments, a determination of whether to change the reputation of an application may be based on heuristics.

In additional embodiments, the reputation of an application may be changed when a preset number or threshold number of endpoints report that the application is attempting to access the decoy resource. The reputation of an application may be changed based on other suspicious behavior detected at one or a plurality of endpoints. However, in another example, a higher reputation such as good or safe reputation may be maintained if only one endpoint reports an access attempt by an application executed on multiple endpoints. Accordingly, if it is determined that remedial action is not necessary, the process may proceed back to block 508. However, if it is determined that remedial action is necessary, the process may proceed to block 514.

At block 514, the remedial action identified at block 512 may be distributed to appropriate endpoints. In some embodiments, the resource distribution module 320 may distribute the remedial action to be taken at one or more endpoints. For example, a changed reputation may be distributed from the backend system (e.g., server 140A) to each of the endpoints (e.g., clients 110, 120, and 130) in the network. The remedial action with respect to the application or process may be distributed with a scheduled policy update to all endpoints in the system, a group of endpoints in the system, or a single endpoint. In addition, the remedial action may be distributed separate from a scheduled policy update.

Each endpoint may control execution of the application identified as a threat in accordance with the received remedial action. In some embodiments, the system resource control module 380 may control execution of the application identified as a threat. For example, the endpoints may prohibit the application from being executed, execute the application in a secured sandbox, execute the application on a virtual client, or limit access of the application to particular system resources. After the appropriate remedial action has been distributed, the process may proceed to block 516.

The overall process 500 may then repeat periodically or continuously. In some instances, various elements of the overall process may be performed concurrently or sequentially. For example, the backend system may be distributing decoy resource information while also analyzing a report received.

At this point it should be noted that detection of advanced security threats in accordance with the present disclosure as described above may involve the processing of input data and the generation of output data to some extent. This input data processing and output data generation may be implemented in hardware or software. For example, specific electronic components may be employed in the detection of advanced security threats or similar or related circuitry for implementing the functions associated with detecting advanced security threats in accordance with the present disclosure as described above. Alternatively, one or more processors operating in accordance with instructions may implement the functions associated with detecting advanced security threats in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for detecting a security threat comprising:
    receiving resource information from a backend server via a network indicating a defined resource to be generated on a plurality of clients, wherein the defined resource to be generated is specified by the backend server based on at least one computing resource characteristic and at least one known usage of at least a first client of the plurality of clients, and wherein the first client is separate from the backend server and associated with a known threat;
    generating the defined resource at the plurality of clients respectively based on the received resource information, wherein the defined resource is a decoy resource different from the received resource information and monitored differently from other client resources;
    implementing the decoy resource automatically on each respective client of the plurality of clients, wherein the implemented decoy resource simulates on the respective client one of a physical computing resource of at least the first client and a virtualized computing resource of at least the first client available to applications executing on at least the first client;
    monitoring system behavior of the respective client having the decoy resource implemented thereon;
    determining by the respective client whether a security event involving the implemented decoy resource has occurred based on the monitored system behavior of the respective client including the at least one computing characteristic and the at least one known usage of at least the first client; and
    generating a report at the respective client including detailed information regarding the security event and the monitored system behavior of the respective client when it has been determined that the security event has occurred and sending the report to the backend server.

2. The method of claim 1, wherein the decoy resource is automatically generated upon receipt of the resource information from the backend server.

3. The method of claim 1, wherein the resource information received from the backend server is included in a policy update.

4. The method of claim 1, wherein the decoy resource is defined in accordance with a classification of at least the first client.

5. The method of claim 1, wherein the system behavior is monitored in accordance with a monitoring policy.

6. The method of claim 5, wherein the implemented decoy resource is monitored at a level higher than the other client resources based on the monitoring policy.

7. The method of claim 1, wherein the monitoring of the implemented decoy resource is defined by the backend server.

8. The method of claim 1, further comprising:
transmitting the report to the backend server, wherein the report includes the detailed information regarding the security event and additional client behavior information, and wherein the security event is an attempted access of the implemented decoy resource.

9. The method of claim 1, further comprising:
creating a virtualized environment on each of the plurality of clients, wherein the decoy resource is implemented in the respective virtualized environment on each of the plurality of clients, respectively.

10. The method of claim 1, wherein the respective client simulates a server and the decoy resource is one of an open port, an SQL Server administrator console, and an application directory.

11. The method of claim 1, wherein the respective client simulates a desktop computer and the decoy resource is one of a remote login, a word-processing document, a cookie, a favorite, and a shortcut.

12. At least one non-transitory processor readable storage medium storing a computer program of instructions configured to be readable by at least one processor for instructing the at least one processor to execute a computer process for performing the method as recited in claim 1.

13. A method for detecting a security threat comprising:
generating, at a backend server, resource information specifying a defined resource based on at least one computing resource characteristic and at least one known usage of at least a first client of a plurality of clients, and wherein the first client is separate from the backend server and associated with a known threat;
transmitting the resource information from the backend server to the plurality of clients via a network;
generating the defined resource at the plurality of clients respectively based on the resource information received at the respective plurality of clients, wherein the defined resource is a decoy resource different from the resource information and monitored differently from other resources;
implementing the decoy resource automatically on each respective client of the plurality of clients based on the generated resource information, wherein the implemented decoy resource simulates one of a physical computing resource of at least the first client and a virtualized computing resource of at least the first client available to applications executing on at least the first client;
determining whether a report has been received from one of the plurality of clients indicating that a security event involving the decoy resource implemented at the one of the plurality of clients has occurred;
analyzing the received report; and
determining an appropriate action to be performed based on the report analysis.

14. The method of claim 13, wherein the report indicates a type of the security event and at least one of an application, process, and user responsible for causing the security event.

15. The method of claim 13, wherein the appropriate action is determined based on additional reports received from at least two of the plurality of clients having the decoy resource implemented thereon.

16. The method of claim 13, wherein the appropriate action is determined based on a predetermined reputation of an application that caused the security event.

17. The method of claim 13, wherein the appropriate action includes at least one of quarantining an application that caused the security event, generating a rule for the application, and adjusting a reputation of the application.

18. The method of claim 13, further comprising:
transmitting information indicating the appropriate action to the one of the plurality of clients.

19. At least one non-transitory processor readable storage medium storing a computer program of instructions configured to be readable by at least one processor for instructing the at least one processor to execute a computer process for performing the method as recited in claim 13.

20. A system for detecting a security threat comprising:
a backend server comprising one or more first computer processors communicatively coupled to a network; and
a plurality of clients each comprising one or more second computer processors and a memory communicatively coupled to the network, wherein the plurality of clients are separate from the backend server and associated with a known threat,
wherein the one or more first computer processors are configured to:
transmit resource information from the backend server to the plurality of clients via the network indicating a defined resource to be generated on the plurality of clients respectively, wherein the defined resource to be generated is based on at least one computing resource characteristic and at least one known usage of at least a first client of the plurality of clients; and
wherein the one or more second computer processors are configured to:
generate the defined resource at the plurality of clients respectively based on the resource information, wherein the defined resource is a decoy resource different from the resource information and monitored differently from other resources;
implement the decoy resource automatically on each respective client of the plurality of clients, wherein the implemented decoy resource simulates one of a physical computing resource of at least the first client and a virtualized computing resource available of at least the first client to applications executing on at least the first client;
monitor system behavior of the respective client having the decoy resource implemented thereon;
determine by the respective client whether a security event involving the implemented decoy resource has occurred based on the monitored system behavior of the respective client including the at least one computing characteristic and the at least one known usage of at least the first client; and generate a report at the respective client including detailed information regarding the security event and the associated system behavior of the respective client when it has been determined that the security event has occurred and sending the report to the backend server.

\* \* \* \* \*